Patented Mar. 16, 1926.

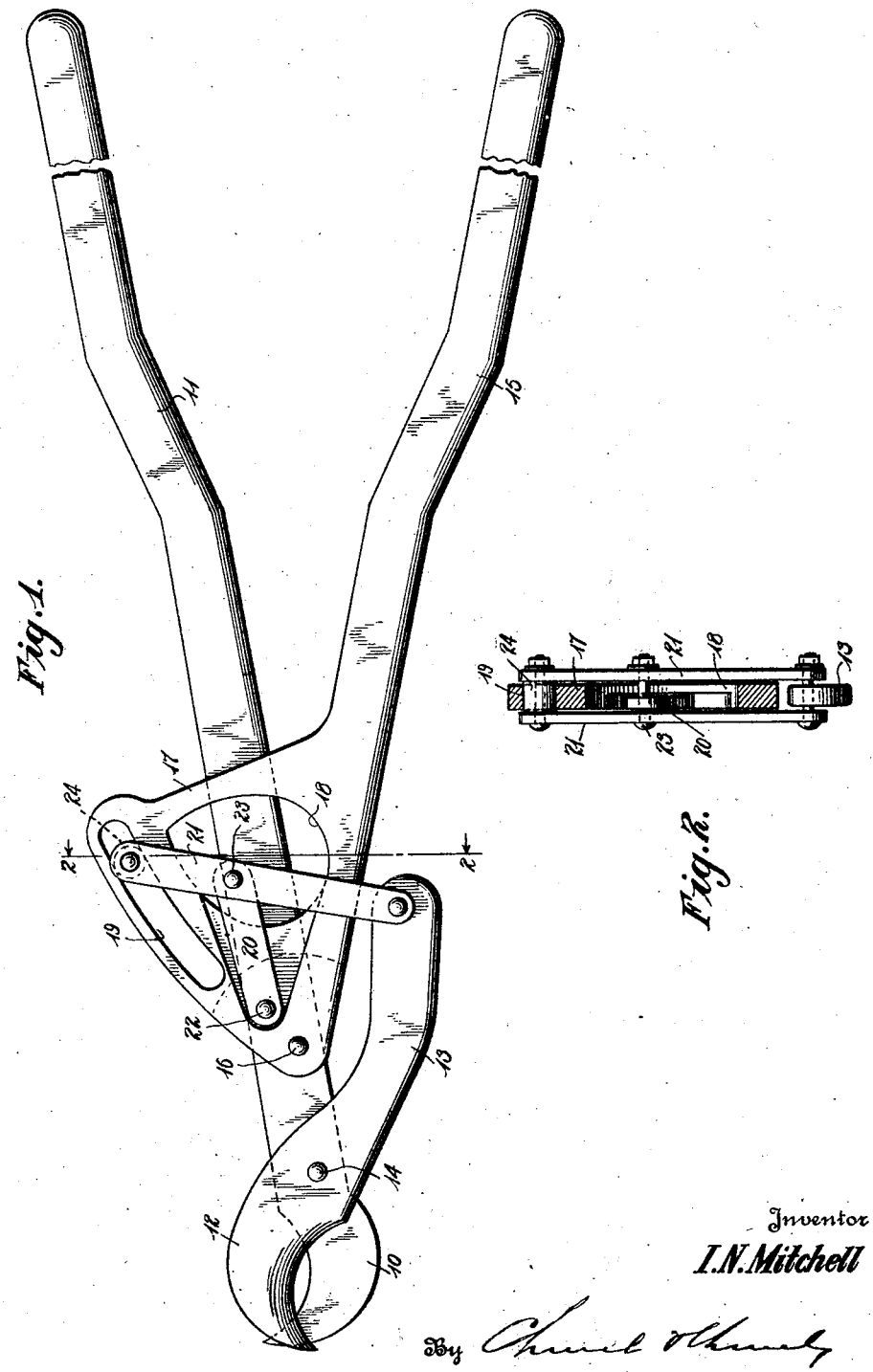

1,577,140

UNITED STATES PATENT OFFICE.

ISAAC NEWTON MITCHELL, OF LOLITA, TEXAS.

DEHORNING IMPLEMENT.

Application filed October 8, 1924. Serial No. 742,472.

*To all whom it may concern:*

Be it known that I, ISAAC N. MITCHELL, a citizen of the United States, residing at Lolita, in the county of Jackson and State of Texas, have invented certain new and useful Improvements in Dehorning Implements; and I do hereby declare the following to be a full, clear, and exact description of the same, reference being had to the accompanying drawings, forming part of this specification.

This invention relates to a cutting tool and particularly to an implement primarily designed for dehorning cattle.

As is well known, the outer shell of the horns of cattle is exceedingly hard while the matter constituting the inner portion of the horn is comparatively easy to cut and for this reason it is desirable to have a dehorning implement in which considerable pressure can be applied to the cutting jaws during the initial portion of their closing movement.

In view of this the present invention contemplates the provision of a dehorning implement in which the power applied to the handles will be multiplied to quite an extent when transmitted to the closing jaws.

A further object is to accomplish the foregoing result by a structure composed of comparatively simple and easily made parts.

With these and other objects in view the invention consists in certain details of construction and combinations and arrangements of parts all as will hereinafter be more fully described and the novel features thereof particularly pointed out in the appended claims.

In the accompanying drawings,—

Figure 1 is a plan view of an implement embodying the present invention.

Fig. 2 is a sectional view on the line 2—2 of Fig. 1.

In the implement contemplated by the present invention one of the cutting jaws 10 is preferably formed integral with its relatively long handle 11, the other cutting jaw 12 being comparatively short and terminating in a shank 13. Jaw 12 is pivoted to handle 11 by a bolt 14 while handle 15, for said jaw, is likewise pivoted to handle 11 by a bolt 16.

Handle 15 is fulcrumed at its end and the load acted upon by it is applied intermediate its ends, the handle thereby constituting a lever of the second class. To increase the pressure applicable to the jaws, however, handle 15 and jaw 12 are connected together by an arrangement of links that will greatly multiply the power exerted on the handles.

This arrangement consists in forming the pivoted end of handle 15 with a head 17 in which there is formed an opening 18 and an arcuate slot 19 and to which there is pivotally connected a link or lever 20 connected to the end of jaw 12 by links 21, said parts being connected to one another by pivot pins 22, 23, respectively. It will be noted that the pivotal connection between the handles is somewhat to one side of the connection between the jaws and that the connection between link 20 and head 17 is likewise a little to the same side of the connection of the handles.

One end of the cross links 21 is attached to jaw 12 at one side of head 17 as described, and the other end of said links have a roller 24 journaled between them adapted to ride along the opposite side of the offset portion of said head, preferably in slot 19. As will be apparent the power exerted on handle 15 to close the jaws is transmitted to jaw 12 through said roller 24 and links 21, the roller sustaining substantially the entire load. To secure the application of a greater power or pressure on the jaws at the initial portion of their closing movement than during the final portion of such movement, links 21 are connected to link 20 at a point which will result in roller 24 being caused to occupy a position relatively close to pivot 16 when the jaws are open, but when said jaws are closed said roller 24 will be caused to move in slot 19 away from said pivotal center. The roller 24, on the point at which the load is located, being closer to pivot 16 during the initial closing movement of the jaws than it is during the final portion of such movement, the application of a uniform quantity of power on handle 15 will result in a greater crushing pressure being transmitted to the jaws during their initial closing than during their final movement.

Preferably head 17 is dished out whereby link 20 will lie flush with the surface of said head and as the bolt passing through said link and the links or cross members 21 in opening 18 is adapted to move transversely and lengthwise of the head due to the relation of the pivotal centers, said opening is preferably made comparatively large although a properly curved slot could be provided in lieu of the opening.

Link 20 and links 21 are attached to each other at a point that will result in the links 21 being raised and lowered as link 20 turns on its pivot, thereby causing the links 21 and roller 24 moving towards and away from the fulcrum of handle 15 to secure the results just described.

In addition to the advantage of having an increased leverage during the initial closing movement of the jaws, the structure whereby this result is obtained, is exceedingly simple, consisting practically of the head 17, links 20, 21, and roller 24, all of which are easily produced at a comparatively low cost.

What I claim is:

1. In a tool of the character described, a jaw having an integral handle, a second jaw pivoted intermediate its ends to said handle, a second handle pivoted to said handle and constituting a lever of the second class, and a connection between said second handle and one end of the second jaw comprising a pivotal cross bar connected at one end to the second jaw and whose other end is movable with respect to the first mentioned handle toward and away from the fulcrum of the handles to increase the throw of the jaw when the handles are moved about their fulcrum.

2. In a tool of the character described, a jaw having an integral handle, a second jaw member pivoted intermediate its ends to said handle, a second handle pivoted to the handle and a connection between said second handle and the second jaw member, said connection embodying a link pivoted to the second handle and a cross bar pivoted on said link, one end of the cross bar being pivoted to one end of the second jaw and the other end of said bar being movable with said second handle and along the side of the second handle whereby the extent of movement of the second jaw is increased.

3. In a tool of the character described, a pair of pivoted jaws movable toward one another, means for closing said jaws comprising a pair of handles, one of said handles being pivoted on the other and constituting a lever of the second class, and a connection between one of said jaws and handles comprising a link pivoted on said handle, a pair of spaced cross bars pivoted to the link, a pivotal connection between said jaw and one end of said cross bars, and a roller journaled in the other end of said cross bars bearing against the side of the other handle said roller being movable along said side of the other handle toward and away from the opposite side of said other handle.

4. In a tool of the character described, a pair of pivoted jaws, one of said jaws having an extension constituting a handle, a second handle for the other jaw pivoted to said extension, and a cross link between the second handle and its jaw, said link being attached to the handle between the handle pivot and the point of application of power thereto, whereby said handle constitutes a lever of the second class, said link being movable with the second handle and with respect to said second handle in a direction away from the handle fulcrum as the jaws are closed to decrease the leverage of the handle whereby comparatively greater power is exerted on the jaws during the initial portion of their closing movement.

5. In a tool of the character described, a pair of pivoted jaws, one of said jaws having an extension constituting a handle, a second handle for the other jaw pivoted to said extension, a cross link between the second handle and its jaw, said link being attached to the handle between the handle pivot and the point of application of power thereto, whereby said handle constitutes a lever of the second class, and means for moving the connection between said cross link and handle with respect to said second handle and away from the fulcrum of said handle during the initial closing movement of the jaws.

ISAAC NEWTON MITCHELL.